United States Patent
Baszucki et al.

(10) Patent No.: US 11,148,051 B2
(45) Date of Patent: Oct. 19, 2021

(54) VIRTUAL REALITY ENVIRONMENT MULTIPLATFORM ADAPTIVE SYSTEM

(71) Applicant: Roblox Corporation, San Mateo, CA (US)

(72) Inventors: David Baszucki, Portola Valley, CA (US); Claus Christopher Moberg, Redwood City, CA (US); Michael McHale, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 15/445,339

(22) Filed: Feb. 28, 2017

(65) Prior Publication Data

US 2018/0243650 A1 Aug. 30, 2018

(51) Int. Cl.
*A63F 13/35* (2014.01)
*H04L 29/06* (2006.01)
*A63F 13/355* (2014.01)

(52) U.S. Cl.
CPC ............ *A63F 13/35* (2014.09); *A63F 13/355* (2014.09); *H04L 65/4084* (2013.01); *H04L 65/80* (2013.01); *H04L 67/38* (2013.01); *A63F 2300/8082* (2013.01)

(58) Field of Classification Search
CPC .......... A63F 13/35; A63F 9/24; A63F 13/497; A63F 13/213; A63F 13/32; A63F 13/44; H04L 65/1063; H04L 67/38; H04L 67/1097; G06F 17/00; G06F 19/00; G06F 9/4552; G06T 1/20
See application file for complete search history.

(56) References Cited

U.S. PATENT DOCUMENTS

| | | | |
|---|---|---|---|
| 9,262,179 B1* | 2/2016 | Currey | G06F 9/4445 |
| 10,102,605 B1* | 10/2018 | Ingegneri | G06T 1/20 |
| 2001/0044339 A1* | 11/2001 | Cordero | A63F 13/12 463/42 |
| 2008/0141147 A1* | 6/2008 | Buhrke | G06Q 10/10 715/757 |
| 2016/0256774 A1* | 9/2016 | Oshima | A63F 13/40 |
| 2017/0157512 A1* | 6/2017 | Long | A63F 13/86 |
| 2017/0246534 A1* | 8/2017 | Johnson | A63F 13/35 |
| 2017/0316608 A1* | 11/2017 | Khalid | G06T 19/006 |

* cited by examiner

*Primary Examiner* — Yingchuan Zhang
(74) *Attorney, Agent, or Firm* — IP Spring

(57) ABSTRACT

A system has a media server enabled to serve interactive digital experiences, and to accept input for control of objects, a plurality of computerized appliances enabled to receive and display digital experiences, and having input mechanisms enabled to provide control input for objects, and an intermediary server executing software, and having access to a data repository. Data interaction between individual ones of the of the computerized appliances and the media server is accomplished through the intermediary server, and upon establishment of data interaction, the technical nature of the display and input apparatus of the particular computerized appliance is determined, data received at the intermediary server from the computerized appliance is modified to the specific format accepted by the media server, and data output from the media server is modified at the intermediary server for optimum display at the particular computerized appliance.

10 Claims, 8 Drawing Sheets

VIRTUAL REALITY ENVIRONMENT MULTIPLATFORM ADAPTIVE SYSTEM

BACKGROUND OF THE INVENTION

1. Field of the Invention

The present invention is in the field of virtual reality (VR) environments and gaming systems, and pertains more particularly to methods and apparatus for normalizing interaction between disparate VR platforms and gaming engines.

2. Discussion of the State of the Art

In the field of Internet-based VR gaming and VR-navigable environments, three dimensional games and environments may be accessed from one or more servers connected to the Internet network by users operating computerized appliances connected to a data network such as the Internet. Devices that may be used to consume VR services include devices having widely different hardware/software platforms and having widely different input capabilities and display capabilities. Some authors produce different versions of games to accommodate different device types. Other authors have built in support for a number of different device classes into one environment or game.

A drawback with either approach is that the VR gaming or environment server must select the appropriate game or environment features and instructions for those devices based on recognition of the device in session. Therefore, the VR server sees disparate devices in session and must process the different instructions and views that each disparate device will receive. Moreover, each device may not encounter the same experiences or quality of service in session as other devices, because of the different capabilities and capacities that exist between these devices. Therefore, what is clearly needed is a multiplatform-independent virtual reality environment interaction system that may be rendered optimally on disparate devices having differing hardware and SW platforms.

BRIEF SUMMARY OF THE INVENTION

In one embodiment of the invention a system is provided, comprising a network-connected media server enabled to serve interactive, virtual-environment digital experiences on the network, and to accept input for control of objects in the virtual environment, the data served and accepted limited to a specific format, a plurality of network-connected computerized appliances enabled to receive and dynamically display virtual-environment digital experiences, and having input mechanisms enabled to provide control input for objects displayed in the virtual environment, and an intermediary network-connected server executing software on a processor from a non-transitory medium, and having access to a data repository. Data interaction between individual ones of the of the plurality of network-connected computerized appliances and the network-connected media server is accomplished through the intermediary network-connected server, and upon establishment of data interaction with the media server for any particular computerized appliance, the technical nature of the display and input apparatus of the particular computerized appliance is determined, input data received at the intermediary server from the particular computerized appliance is modified to the specific format accepted by the media server, and data output from the media server intended for the particular network-connected computerized appliance is modified at the intermediary server for optimum display at the particular computerized appliance.

In one embodiment, the network is the Internet network, and the digital experiences served are video games. Also in one embodiment modification constructs for a plurality of known types and models of computerized appliance platforms capable of interaction with virtual-environment digital experiences are stored in the data repository, and accessed to modify display and input data from and to specific types and models of the platforms identified.

In another aspect of the invention a system is provided, comprising a network-connected media server enabled to serve interactive, virtual-environment digital experiences on the network, and to accept input for control of objects in the virtual environment, the data served and accepted limited to a specific format, a network-connected computerized appliance enabled to receive and dynamically display virtual-environment digital experiences, and having input mechanisms enabled to provide control input for objects displayed in the virtual environment, and software executing on a processor at the computerized appliance, execution of the software modifying input for control of objects in the virtual environment to the specific format acceptable at the media server, and modifying incoming data, in the format specific to the media server for display, to be optimal for the computerized appliance.

In one embodiment, the network is the Internet network, and the digital experiences served are video games. Also in one embodiment, the system further comprises software executing on a processor at individual ones of the plurality of network-connected computerized appliances, wherein the software modifies input data to the specific format acceptable by the media server, and the intermediary server modifies display data destined for the individual computerized appliances.

In another aspect of the invention a method is provided, comprising serving interactive, virtual-environment digital experiences on the network by a network-connected media server, and accepting, by the media server, input for control of objects in the virtual environment, the data served and accepted limited to a specific format, establishing data interaction with the media server by a particular computerized appliance, determining, by an intermediary server executing software on a processor, the technical nature of display and input apparatus of the particular computerized appliance at time of establishing the data interaction, modifying, by execution of the software at the intermediary server, input data from the particular computerized appliance, intended for the media server, to the specific format required by the media server, and modifying, by the intermediary server, data output by the media server, intended for the particular computerized appliance, from the specific format of the media server to a format optimized for the particular computerized appliance.

In one embodiment, the network is the Internet network, and the digital experiences served are video games. Also in one embodiment modification constructs for a plurality of known types and models of computerized appliance platforms capable of interaction with virtual-environment digital experiences are stored in the data repository, and accessed to modify display and input data from and to specific types and models of the platforms identified.

In yet another aspect of the invention a method is provided, comprising serving interactive, virtual-environment digital experiences on the network by a network-connected media server, and accepting, by the media server, input for control of objects in the virtual environment, the data served and accepted limited to a specific format, establishing data interaction with the media server by a particular computerized appliance, modifying, by execution of software on a processor of the particular computerized appliance, input data intended for the media server, to the specific format required by the media server, and modifying, by execution of the software on the processor of the particular computerized appliance, data received from the media server, from the specific format of the media server to a format optimized for the particular computerized appliance.

In one embodiment, the network is the Internet network, and the digital experiences served are video games. And in one embodiment, the method further comprises executing software on a processor at individual ones of the plurality of network-connected computerized appliances, wherein the software executed at the particular computerized appliance modifies input data to the specific format acceptable by the media server, and the software executing at the intermediary server modifies display data destined for the individual computerized appliance.

BRIEF DESCRIPTION OF THE SEVERAL VIEWS OF THE DRAWINGS

FIG. 3 is a united model diagram illustrating a generic client device model and model attributes associated there with.

DETAILED DESCRIPTION OF THE INVENTION

The inventors provide a unique process and system that provides selective control of instructional and display data streams propagated during a virtual reality (VR) session and two or more network-connected, but disparate end devices/platforms interacting with a virtual reality environment (VRE). The present invention is described in enabling detail using the following examples, which may describe more than one relevant embodiment falling within the scope of the present invention.

Figure 1:
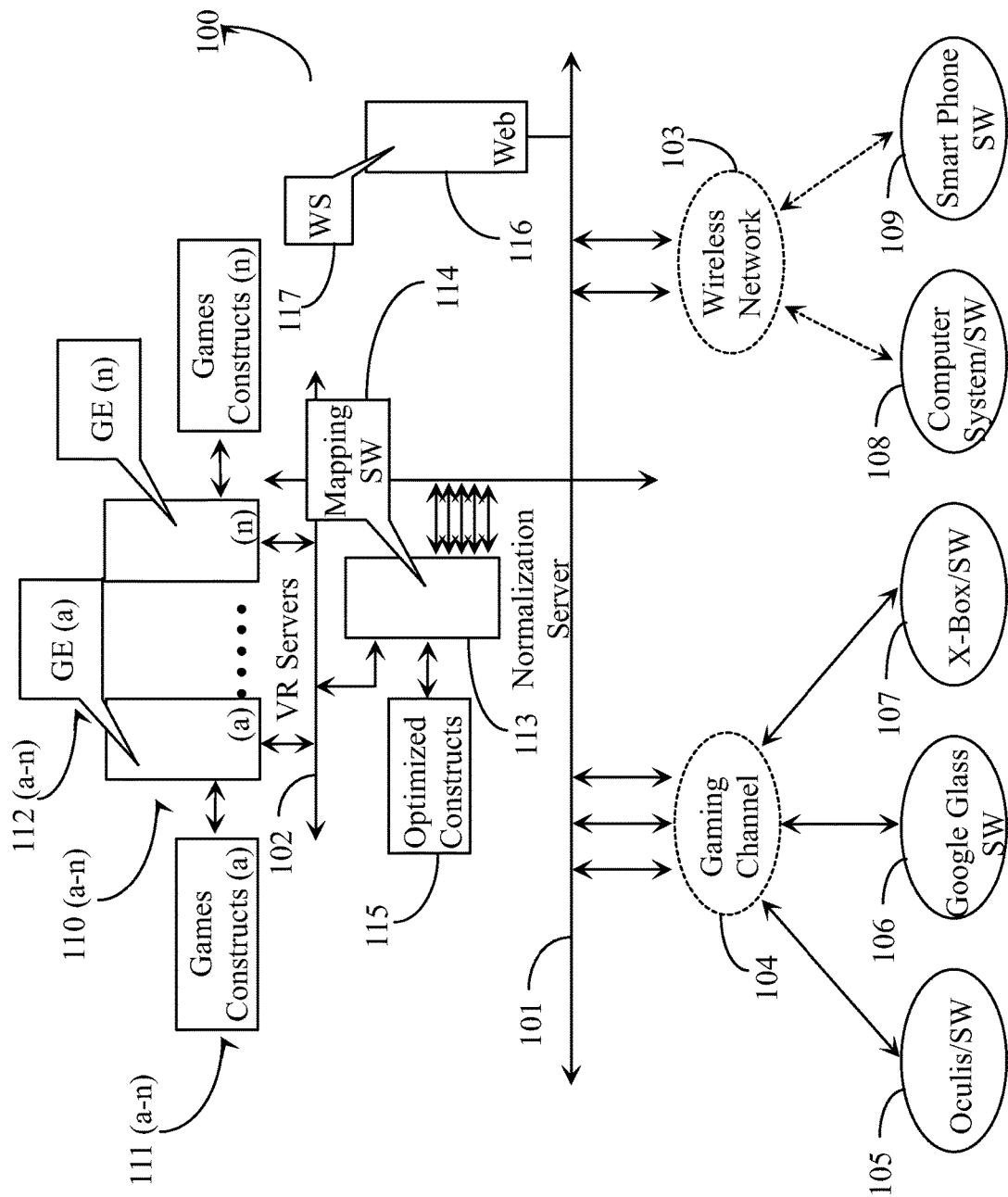
FIG. 1 is an architectural diagram of a virtual reality (VR)-enabled gaming network supporting VR experience optimization for connected disparate end devices, according to an embodiment of the present invention.

FIG. 1 is an architectural diagram of a virtual reality-enabled gaming network 100 supporting optimization of VR experience for connected disparate end devices, according to an embodiment of the present invention. Network 100 includes an Internet network logically depicted herein as a network backbone 101. Network backbone 101 may represent all of the lines, equipment, and access points that make up the Internet as a whole including any connected sub-networks. The reference to Internet 101 should not, however be construed as a limitation of practice of the present invention as backbone 101 may represent a wide area network (WAN) that is not an Internet network such as a corporate WAN for example.

Network backbone 101 supports a Web server 116. Web server 116 may be a server hosting a Website for an enterprise such as a virtual reality (VR) gaming provider. Web server 116 may host a Website (WS) 117. WS 117 may be an access point for clients of a gaming provider. Clients of such a provider may become members or otherwise subscribe to WS 117 to play VR three dimensional (3D) games or join active VR environments. Internet 101 supports connection through an Internet network segment 116 to a cloud network 102 of VR servers 110 (a-n). In this implementation, VR servers 110 (a-n) are cloud servers hosted by a third party entity and leased by businesses and individuals. In another implementation, servers 110 (a-n) may be maintained by a gaming provider without departing from the spirit and scope of the present invention.

VR servers 110 (a-n) each host at least one gaming engine (GE) 112 (a-n). Gaming engines (112 (a-n)) are responsible for serving a VR game or environment to clients accessing from network-capable end devices and systems. In this implementation, individual gaming end devices or systems are represented herein as an Oculus™ VR system and software (SW) 105 having access to Internet 101 through a wireless or wired gaming channel or access network 104; a Google Glass™ system and SW 106, and an X-Box™ system and SW 107. Systems 106 and 107 are also accessing Internet 101 through a gaming channel or access network 104. It is noted herein that SW associated with each VR system 105, 106, and 107 is intended to represent the software application provided with the gaming device or gear (head set/goggles/console, etc.) to enable connection to VR servers 110 (a-n) and the engagement in a game or VR session served by one of gaming engines 112 (a-n). Further represented herein are a traditional computer system and SW 108 having connection to Internet 101 through a wireless network 103, and a smart phone and SW 109 connection to Internet 101 through the same wireless network 103.

It is noted herein that end devices 105 through 109 are disparate devices having different input and rendering capabilities, different platforms, and likely very different operating systems. Commonality for these disparate devices used to play games or to navigate a VR environment may otherwise be limited to access ability, display ability, and input ability where inequalities may exist among those abilities from device to device relative to a quality of play experience that may be available for users operating those devices the users engaged in a same VR environment or 3D game.

In one embodiment of the present invention, a system for normalizing disparate end devices in view of VR servers 110 (a-n) is provided and hosted on a server 113 termed herein a normalization server. Normalization server 113 may function as a proxy or intermediate server that brokers session communication between end devices 105 through 109 and any one of VR servers 110 (*a-n*). Server 113 hosts an element-mapping software (SW) 114 and a data repository 115 of game or VR language elements labeled herein as optimized constructs.

Server 113 may broker VR and Gaming sessions between VR servers 110 (*a-n*) and end devices 105 through 109. Server 113 enables VR servers 110 (*a-n*) and more particularly individual game engines 112 (*a-n*) to view disparate end devices as a single abstracted device class relative to the data sent to the end devices and the data received from the devices during interactive sessions. For example, a VR environment or game may be created using instructional elements and features modeled after an example of an end device that may typically have access to a higher quality of service regarding interaction in general, such as Oculus™ and SW 105, for example. In such an implementation, a game engine like engine 112 (*a*), for example, may view the other devices playing the same game or navigating the same VRE as the Oculus™ system and SW 105. That is to say, all of the end devices playing a single game or VRE appear the same in terms of what features to deploy and elements required in the stream to the client end devices and that are recognized as input from the client end devices. In another implementation, the abstract set of elements may be modeled after a virtual end device and SW.

To optimize VR experience for the remaining end devices that are not the Oculus™ system, game or VR language elements and instructions may be created to provide a best possible experience for clients using systems and or devices that are different from the Oculus device or the VR end device model used. Such elements stored in data repository 115 as optimized constructs may be mapped in real time during interactive sessions for the purpose of augmenting the VR or game streams sent to different devices to maintain high QOS and experience while normalizing the input from the end devices back to the original abstraction, thus rendering each end device as a single entity from the viewpoint of the VR server.

In this implementation, it is assumed for purposes of discussion, that end devices 105 through 109 are all connected to one of servers 110 (*a-n*) and a same game engine 112 (*a-n*), thus engaged in the same VRE or 3D game. Also in this implementation, it is assumed that communication is brokered or proxied through normalization server 113 running mapping SW 114 and utilizing the constructs in data repository 115 to augment the stream from the cloud server to the end devices and to normalize the stream from the end devices back to the cloud server. Several bi-directional arrows (five in number) in FIG. 1 logically represent the data streams or session streams from each of the end devices received at server 113. The same arrows represent the augmented data from the cloud server destined to the end devices.

In general implementation and use, according to the instant embodiment, using a normalization server running an element-mapping software, clients operating devices 105 through 109 are assumed connected online and engaged in a VRE or game while connected to one of VR servers 110 (*a-n*) and the game engine 112 (*a-n*) responsible for serving the VRE or game selected by the clients through their end devices. In one embodiment, the clients operating the end devices may all join the VRE or game through their preselected Avatars. From the VR server perspective, all of the end devices are the exact same class of device relative to hardware platform and input and display capabilities.

Each end device accesses the VR server and environment or game through normalization server 113. Mapping SW 114 may contain instruction for determining from the end device at least device type, platform, display capabilities, input methods, graphics acceleration capabilities, and 2D and 3D capabilities. Input methods may include those enabled through peripheral devices including sensors that may be provided with those peripheral devices. It may be appreciated by one with skill in the art of multiplatform gaming that each of the disparate end devices may interact with the same game or VRE features, but will be using differing input methods, that may involve different hardware and or SW to enable. For example, X-box device 107 may use a kinetic sensor to map a virtual space and those within it, while smart phone 109 with certain SW may also use a kinetic sensor but will utilize it in a very different way. Where one device may use a click screen technique for navigation, another device may use a mouse or pointer.

In this implementation, mapping SW 114 functions to intercept and buffer the incoming stream from the cloud server to a particular end device engaged in session. SW 114 may augment or entirely replace instruction from the VR server to reflect a more detailed device-specific instruction recognizable to the particular device and platform addressed. Similarly, certain optimized constructs might be created and afforded for a particular display type, size, user interface, and or graphics acceleration capability. These constructs stored in repository 115 may be created by the provider of the VRE or 3D game, or they may be created by a third party. In the first case, the constructs might be created by the authoring entity of the VR product. In the latter case, the third party may research and create independent constructs that most compliment the experience for a particular device.

In this implementation, end devices 105 through 109 get instruction that most compliments the ability of the device to engage at the highest possible QOS and interactive experience. Also in this implementation, client device input going back to the cloud server is raw, reflecting actual device input methods and capabilities according to the device, SW, and its use. When server 113 receives stream data back from a client on the way to one of servers 110 (*a-n*), it buffers and normalizes the data by replacing the more device and platform-specific constructs in the data with the original more abstracted constructs, thus normalizing the data back to the server.

Optimized constructs may be created by first party or third party knowledge workers and stored for use in repository 115. Mapping SW 114 may augment the data in near real time by replacing certain abstract portions of the data with the optimized constructs that are specifically created for the type device and platform of the end device engaged in a session with the game engine. Mapping SW 114 may map from an abstract construct in the VR stream to an optimized construct stored in repository 115 relative to the specific device type and platform of the instant device engaged in session. Mapping SW 114 may also map from a device specific construct whether optimized or not back to the original abstract construct or constructs used at the server. In this implementation, mapping SW 114 and replacement and or insertion of optimized constructs into VR data is performed on a server that may be transparent to both the game engine and VR server and to the client device. However, this should not be construed as a limitation to practice of the invention, as the optimized constructs and mapping SW may be stored locally on participation game devices and systems as well. In another implementation, the capability may be distributed between end devices and a proxy server system according to an optimized workload sharing scheme that may vary depending on device and native device capabilities.

In one implementation SW (mapping/normalization) may reside on the VR server platform and all optimized constructs may be served at the head-end of a VR stream so that each end device may select the device-appropriate optimized constructs to utilize. Input back to the game engine may also be normalized on the VR server platform before implementation of those inputs by the game engine.

Figure 2:
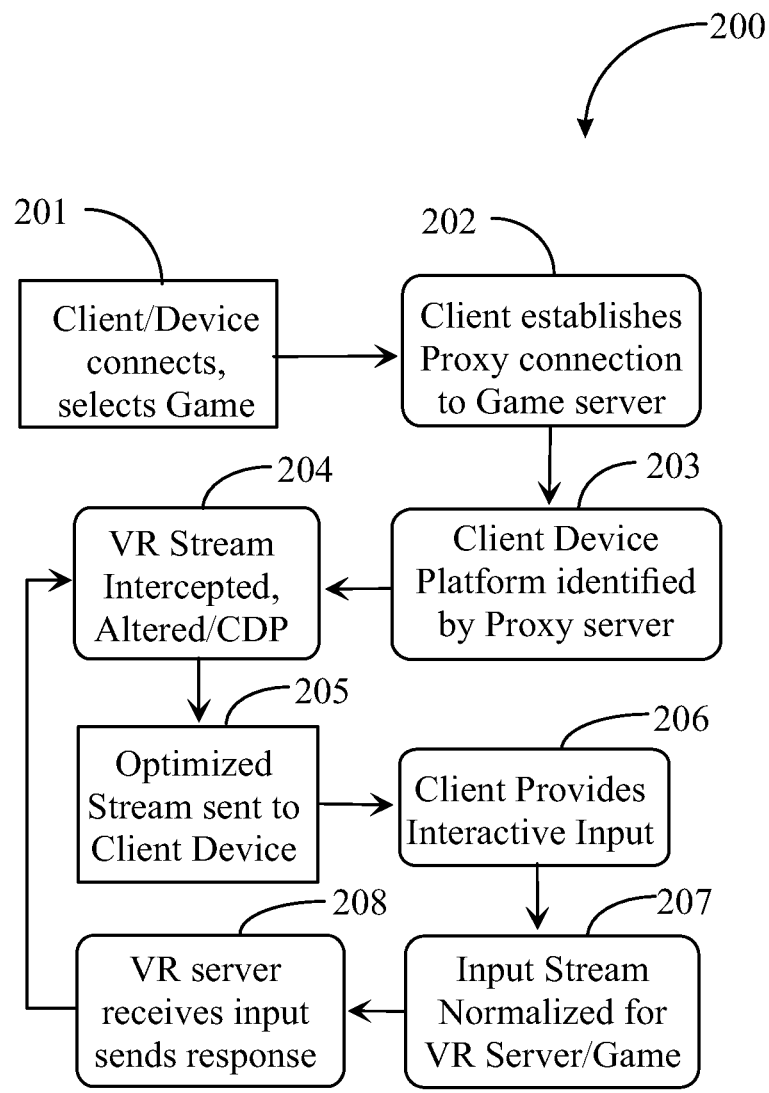
FIG. 2 is a process flow chart depicting a process managing platform/device independent interactive sessions between a client device and platform and a VR server, according to the embodiment of FIG. 1.

FIG. 2 is a process flow chart depicting a process 200 managing platform/device-independent interactive sessions between a client device and platform and a VR server according to the embodiment described above with reference to FIG. 1. At step 201, a client end device analogous to any of devices 105 through 109 of FIG. 1 may connect online and select a virtual reality environment (VRE) or a 3D game. Connecting online and selecting a game may be accomplished through a Website and may include a gaming application running on the client device that enables quick connection to the Website and game. At step 202, the client establishes a connection with a VR cloud server and game engine through a proxy server running a construct-mapping application analogous to normalization server 113 of FIG. 1. This may be accomplished via the Website and or local gaming application installed on the client device.

At step 203 the client device and platform of the device is identified by the proxy server. In this step the optimized constructs that are available to the proxy mapping SW may be attributed to the client device and the platform identified. At step 204, the VR stream from the cloud server to the client device may be intercepted and buffered at the normalization server. Also in this step, the mapping SW may alter or augment abstracted data in the stream with optimized constructs according to the discovered client device type and platform. Several facets of interaction between the game server and the device might be optimized by inserting or overlaying the optimized constructs for implementation by the device in place of the more abstract constructs served to the client. Knowledge of the device includes at least hardware knowledge, device specification and capacity knowledge, and knowledge of SW and OS operating on the device.

Optimized constructs represent customization components that have been previously created for the client device type and platform and that may be inserted into the data passed on to the client from the normalization server. The optimized constructs may be used to replace existing constructs (co-constructs) or may be inserted along with the existing co-constructs with a priority flag marking them, so that the end device SW may select and execute or otherwise implement them over the more generic or abstracted co-constructs in the stream. Optimized constructs may include constructs that control graphics rendering options on the device, constructs that control display options on the device, constructs that control camera options for the client's game Avatar, constructs that control navigation options for the Avatar, constructs that control general interaction with the VR environment or game features, and so on.

Mapping to optimized constructs may involve identification of one or more, or a set of abstract constructs served by the cloud server relative to a particular client end device having special optimized constructs stored on its behalf and selecting one or more of or a set of the optimized constructs to include into the data stream with a priority flag for the end device to execute the optimized constructs over the abstract co-constructs. In one implementation, abstract co-constructs may be eliminated from delivery to the client, the co-constructs replaced in the data by the device specific optimized constructs.

At step 205, the optimized data stream is served to the connected client device. Steps 203, 204 and 205 may occur on the normalization server relative to the data from the cloud being passed on to the client. At step 206, the client device receives the data stream and may provide interactive input. In this implementation, the client device SW recognizes the optimized constructs (features, instructions) as native to, or at least as customized to the current device specifics, including at least hardware arrangement, SW ability, processor type and capacity, storage capacity, input capacities, graphics rendering abilities, and display specifications.

At step 207, the raw data from the client may be received by the normalization server on its way to the VR server, and may be normalized by mapping software to output to the VR server and game engine. Normalization of the data for the cloud may include mapping of the optimized constructs or sets of constructs back to the more abstract co-constructs stored locally on behalf of the VR game engine, and outputting the normalized data back to the cloud server. At step 208, the VR cloud server receives the input, applies it, and delivers response according to the client's interactive input. Step 207 may occur on the normalization server relative to client data going back to the game engine. The process may then resolve back to step 204 and loop through, while the client is in session. Each different client device receives data customized to provide an optimal experience on that device, while the game server may process all of the device input as if all devices are the same device.

Figure 3:
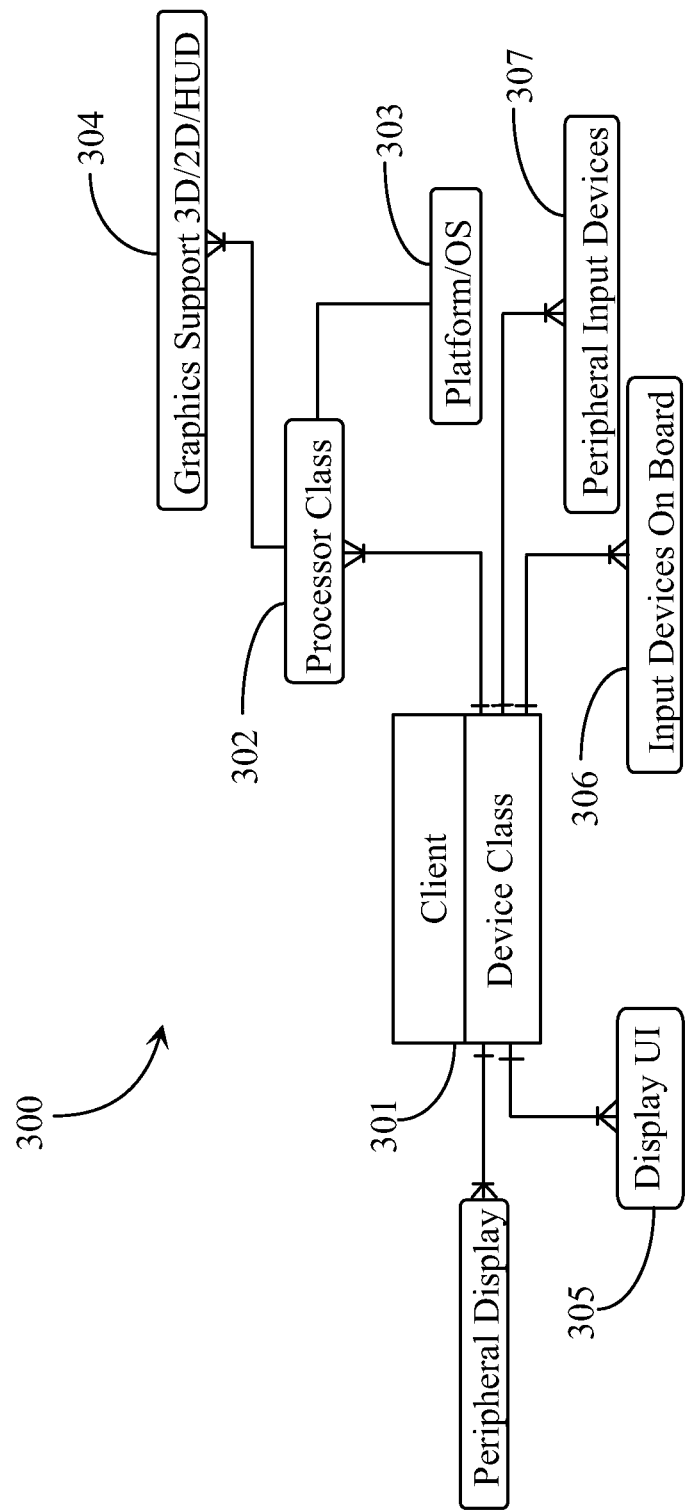

FIG. 3 is a united model diagram illustrating a generic client device model 300 and model attributes associated therewith. Model 300 begins at its most abstract level as a client device class 301. Device class 301 may have one or more than one optional display and graphics user interface (UI). Device class 301 may include one or more of a processor class 302. Processor class 301 may have one or more graphics support options 304. Processor class 302 may support a platform and operating system 303. In one implementation more than one platform and operating system may be supported by a processor class. Device class 301 may represent, at least abstractly, any of end devices 105 through 109 of FIG. 1.

Device class 301 may have one or more than one data input device 306 on board or physically on the device. Physical examples present as device class attributes may depend on the device, such as touch panel of controls for a touch screen or a physical controller with buttons or toggle. Device class 301 may also have one or more than one peripheral input device 307 that may be tethered directly to or otherwise connected to the device. Physical examples may include a remote controller, a wearable device supporting one or more sensors, such as a kinetic sensor, etc. Device class 301 may represent a specific gaming device once all of the attributes of the model are fleshed out, such as one of end devices 105 through 109 of FIG. 1. Constructs created for these specific end devices address the actual attributes of the device, including which input devices and methods are employed by the device in interaction. Optimizations may include rendering and display options for use on different display types and sizes. Optimizations may include additional support for alternate forms of input the device might be capable of, such as assignment of key pad characters to game input controllers or navigators, enabling of virtual controllers for touch screen input, recognition and enabling of peripheral input devices including those using sensors for measurement of distance, momentum, accuracy, and so on.

At the normalization server, all of the data from all devices connected to and engaged in a VRE are normalized before destination so that the game server sees all of the interactions such as navigation, use of virtual resources like weapons, maneuvers, and other actions as all coming from a same device and platform, and processes each request identically and serves results identically as if all the end devices are the same device. In this way workload may be reduced in the cloud server and end devices for which constructs have been created and are available, receive the most optimal interaction environments in gaming and optimal rendering on the particular device. In one implementation, end devices may be enabled to store optimized constructs that have been created for those particular devices and to perform stream augmentation and normalization on board.

In this way, a device having the power and capabilities may be responsible for mapping existing constructs to optimized co-constructs that are selected on board to augment the incoming stream from the cloud server. In this way for some devices a normalization server or proxy may not be required. For some other device classes, some mapping and normalization may be assigned to an end device while certain other mapping and normalization may be performed on an intermediary node, such as the normalization server.

An optimized construct specific to a certain device class may include instruction specific to the device properties and hardware/input capabilities of the device, and may be wholly different than a construct for that same general purpose that already exists in the game stream for the modeled device class representing the abstraction. In one implementation the existing constructs in the game feed may be too abstract for any one device to navigate without mapping to a co-construct with the proper attributes for that device. In another implementation the constructs in the game may be crafted according to one selected end-device having full capabilities, such that only that device class may engage without mapping or normalization, while other connected devices may rely on mapping and normalization regardless of whether it is done on the device or on a separated node like a normalization server.

Figure 4:
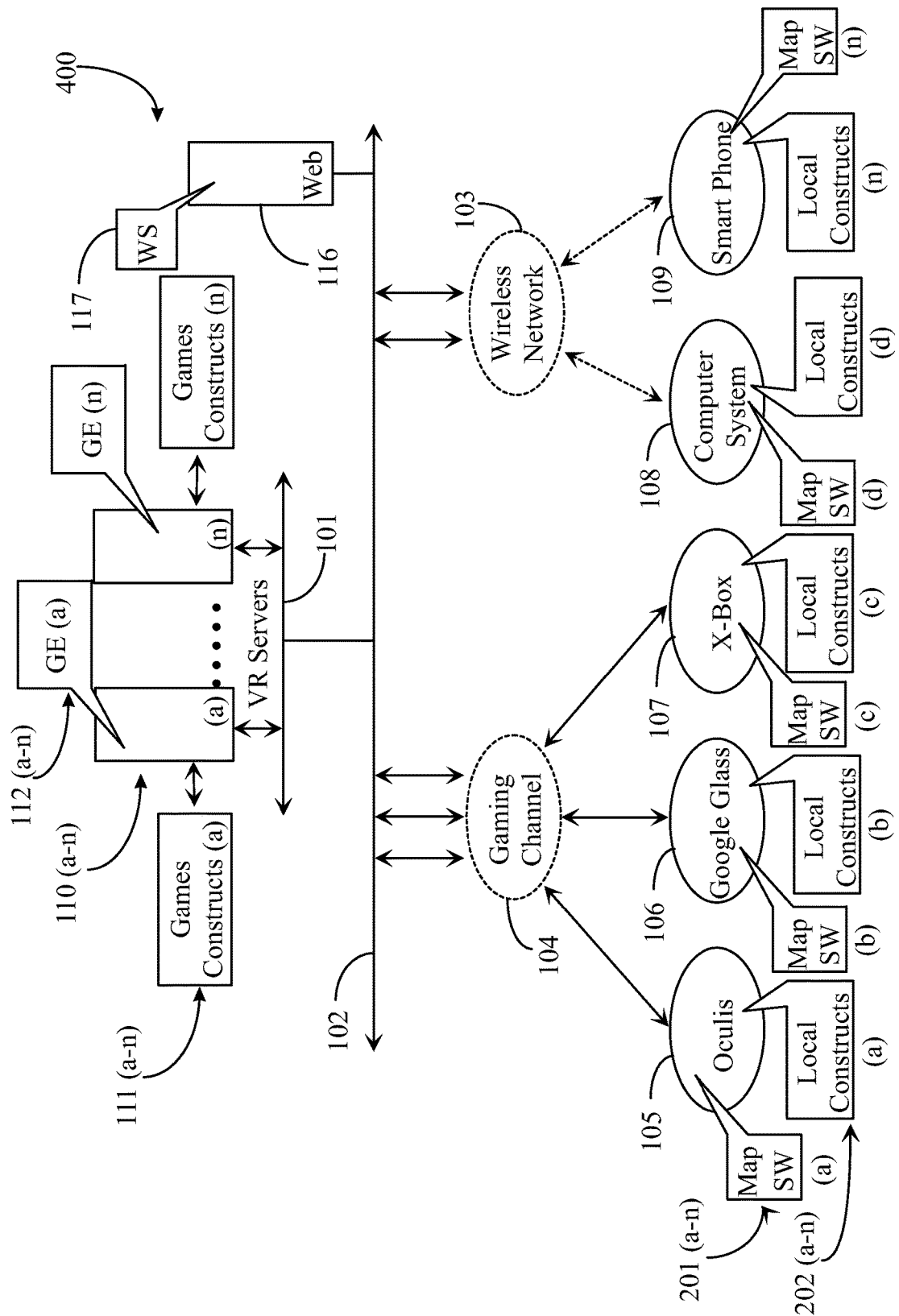
FIG. 4 is an architectural diagram of a VR enabled gaming network supporting VR experience optimization for connected disparate end devices, according to another embodiment of the present invention.

FIG. 4 is an architectural diagram of a virtual reality (VR)-enabled gaming network 400 supporting VR experience optimization for connected disparate end devices according to another embodiment of the present invention. Network 400 is somewhat analogous to the architecture of network 100 of FIG. 1, with an exception that data augmentation and normalization is performed on end devices rather than at a normalization proxy server such as server 113 of FIG. 1. In this embodiment, devices 105 through 109 may previously cache optimized constructs locally in respective caches 202 (a-n). The optimized constructs may be downloaded from the gaming server, the gaming Website, or perhaps from a third party site prior to entering a VRE or 3D game served by any of cloud servers 110 (a-n).

In this embodiment, mapping SW 201 (a-n) may provide one instance of SW on each end device in order to map on-board the respective device to appropriate co-constructs stored locally when interacting with the game or VRE. Storing the co-constructs locally includes on-board caching, but may also include peripheral device storage. In a variation of this implementation, certain co-constructs may be stored locally and mapped to on-board of an end device while other co-constructs may be stored at a normalization server running mapping SW such as server 113 hosting SW 114 of FIG. 1. In such an implementation, the exact ratio of on-board processing vs off-device processing (Proxy) may vary from device to device. Also in such an implementation, a normalization server might proxy the connection between the cloud server and end device.

In a variation of this embodiment, the optimized constructs may be created and included at the head-end of the original streaming data from the game engine, whereby the mapping and normalization SW resides on the VR server platform. In this case, each end device simply may select which of the optimized constructs to use based on the device input and rendering capabilities they are employing in interaction. The raw input from each of the end devices may be normalized on either the end device or at a proxy, or on the VR platform itself, so that the game engine may receive the normalized data input from all of the end devices engaged, and may therefore view all of those devices as the same device.

Figure 5:
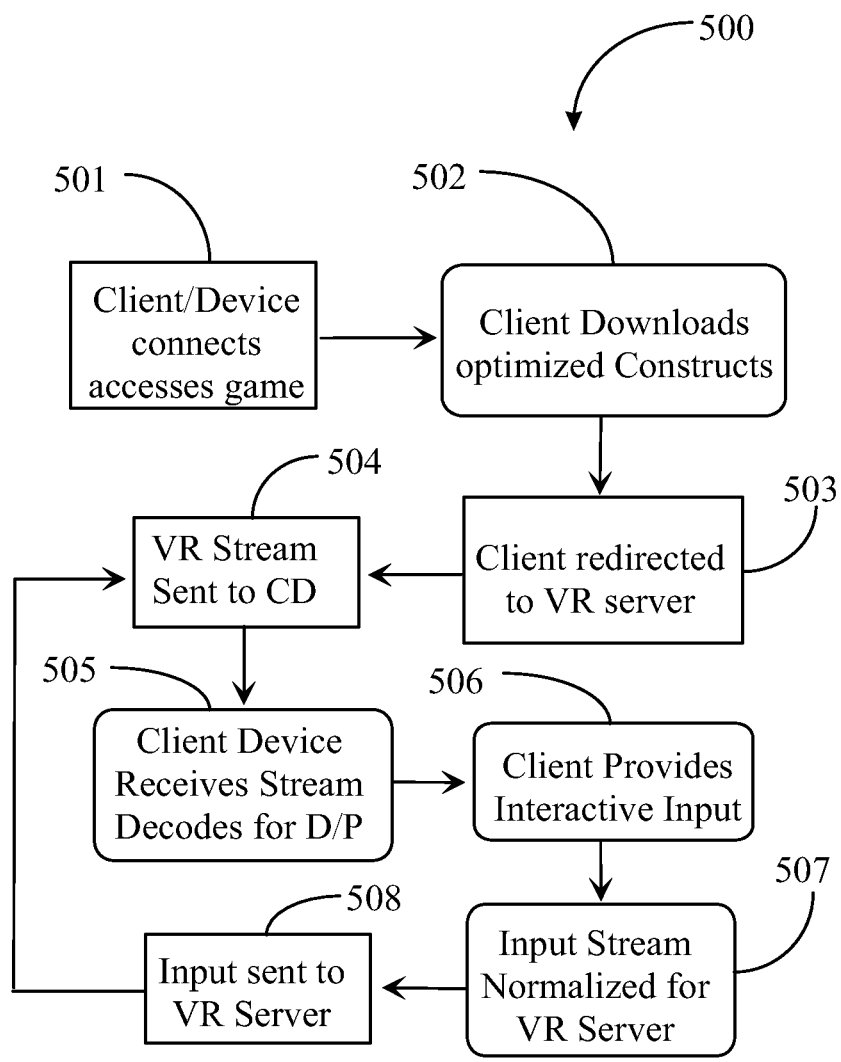
FIG. 5 is a process flow chart depicting a process managing platform/device independent interactive sessions between a client device and platform and a VR server, according to the embodiment of FIG. 4.

FIG. 5 is a process flow chart depicting a process 500 managing platform/device independent interactive sessions between a client device and platform and a VR server according to the embodiment of FIG. 4. At step 501 a client device may connect to a Website and select a game for access. The Website may be a gaming provider site and access point for subscribed members. The client device may include a client device-executed and running gaming application that provides a user interface for the client to select and access games and or virtual reality environments such as worlds, for example. It may also be noted that in this aspect the client device may also host mapping SW and a storage sufficient to at least temporarily store optimized constructs.

At step 502, the client device may download and temporarily cache or otherwise store one or more than one optimized construct or a set of optimized constructs. These constructs may be downloaded from the Website serving the game list or list of worlds to join. The optimized constructs may be available for download only if the client has selected a game or VRE and is committed to joining it. At step 402, the client device may be redirected to a VR game server and specific game engine serving the selection of the client to which the downloaded constructs have been created for. At step 504, the VR server may send the game data to the client device. In this aspect, there may be no proxy server.

At step 505, the client device may receive the VR stream and may parse the data according to device class and platform. In this step, the mapping SW on the client device may map certain data (abstracted constructs) to optimized constructs stored in cache memory or in other storage on the device. The optimized constructs are used by the device class over the abstract constructs to interact with the data served and rendered to display. At step 506 the client may provide interactive input such as selecting, navigating, etc. based on game action. This input is rendered using native instruction including optimized constructs on the device and mapped back to abstract co-constructs to normalize the data for the cloud server at step 507. At step 508, the input is sent to the VR server. The VR server applies the data and sends more VR data back to the client and the process loops (504 through 508) until the session may be terminated. Data incoming into the end device may be buffered in order to enable appropriate parsing and mapping and augmentation or swap of the data for specific use on the device. In one implementation, the optimized constructs downloaded to the device may be automatically deleted from cache after a session has terminated. If a different game is selected, another set of optimized constructs may be made available for download to cache.

Figure 6:
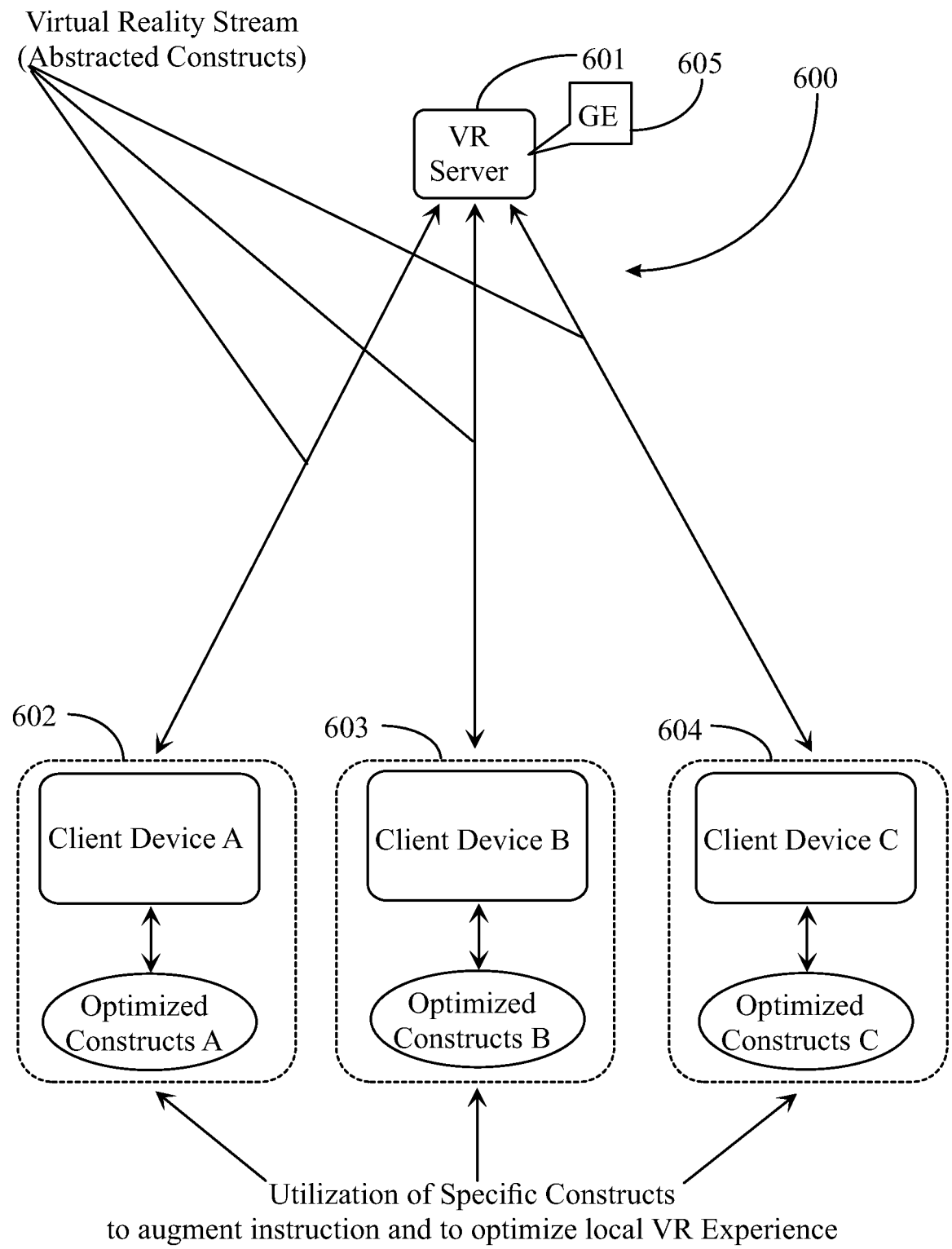
FIG. 6 is a block diagram depicting communications between a VR server and two or more disparate end devices connected to and interacting with a virtual environment, according to the embodiment of FIG. 4.

FIG. 6 is a block diagram 600 depicting communications between a VR server and disparate end devices connected to and interacting with a virtual environment according to the embodiment of FIG. 4. To further illustrate an embodiment where the end devices perform construct mapping and data normalization without the aid of a proxy server, a VR server 601 is depicted running a game engine 605 serving a specific game to a client 602, a client 603, and to a client 604. Client devices 602, 603, and 604 may be widely disparate device classes as was described with reference to FIG. 1 and devices 105 through 109.

Devices 602, 603, and 604 all have sessions in progress with VR server 601 and game engine 605, and are engaged in a VRE or 3D game play as logically indicated herein by double arrows between the devices and the server, which may be a cloud server. It may be assumed in this example that each client joined the session and has an avatar in the game or environment. From a perspective of VR server 601, all devices 602 through 604 appear as the same device class relative to the game or VRE language including instruction, feature description, and device capability to interact with such features. Therefore, all data to client devices comprises abstract constructs including instruction that is modeled after one device class or a virtual device model similar in respect to model 301 of FIG. 3.

Client device A has access to locally stored optimized constructs A. Optimized constructs are instructions that are less abstract than co-constructs interpreted at the VR server and game engine. The term optimized refers to the fact that the construct is created in a more detailed state that addresses instruction specific to use on the instant device class and current hardware and SW platform. In the creation thereof, the optimal experience that the instant device is capable of in interaction is taken into account. Such optimized constructs may address how visual data is rendered and displayed, what interactive options for navigation the client avatar has available, whether a virtual controller is provided in case of lack of physical controller, how sensors for kinetics, movement, pressure, and the like are utilized during input, and so on.

Device 603 has access to constructs B, for the same game but not for the same device or hardware/SW platform. Therefore, constructs B may be very different than constructs A for device A, wherein both sets of constructs are created for interaction with the same VRE or game. Optimized constructs may be downloaded to device memory, such as a cache prior to joining a VRE or game but after selecting the game. They may be deleted from cache after a session is terminated. That is to say that the time to live (TTL) for optimized constructs downloaded to any device may be the duration of the session in which they are used to augment or replace more abstract data. In one embodiment, a client may be required to join a game through an avatar whereby the optimized constructs may be downloaded based on a quick review of the device hardware, software, and input capabilities on line before the game stream is served to the client.

The stream from server 601 is received by a client and parsed for constructs that may map to optimized constructs locally stored on the device. In one implementation, optimized constructs and their co-constructs in the original data from the server (abstracted) are flagged for mapping and prioritization of the optimized construct over the abstract co-construct in near real time using buffer technology to buffer the data for processing locally. Input by the client including interaction and selection may be governed by the optimized constructs. However, the input is normalized by reversing the mapping back to the appropriate co-construct reflecting the more abstract version of the data input for the server. In this respect, all of the devices appear the same in interaction with the server and game.

In a variation of this implementation, SW (mapping/normalization) may reside on the server platform rather than locally at each client. In such an implementation, the optimized constructs for all supported devices may reside at the head-end of each VR stream. In this way each client may select from more than one construct, the selection made pertinent to the selecting device. Normalization may be performed locally as well or on the VR server with the mapping and, in this case provision of the optimized constructs to the server stream. In this entire process the parties (server/player) are neutral participants. That is to say that the player sees an interactive "thing" VRE or #D Game for example, suited for his or her device, while the server sees a same "device" engaged in the environment.

Figure 7:
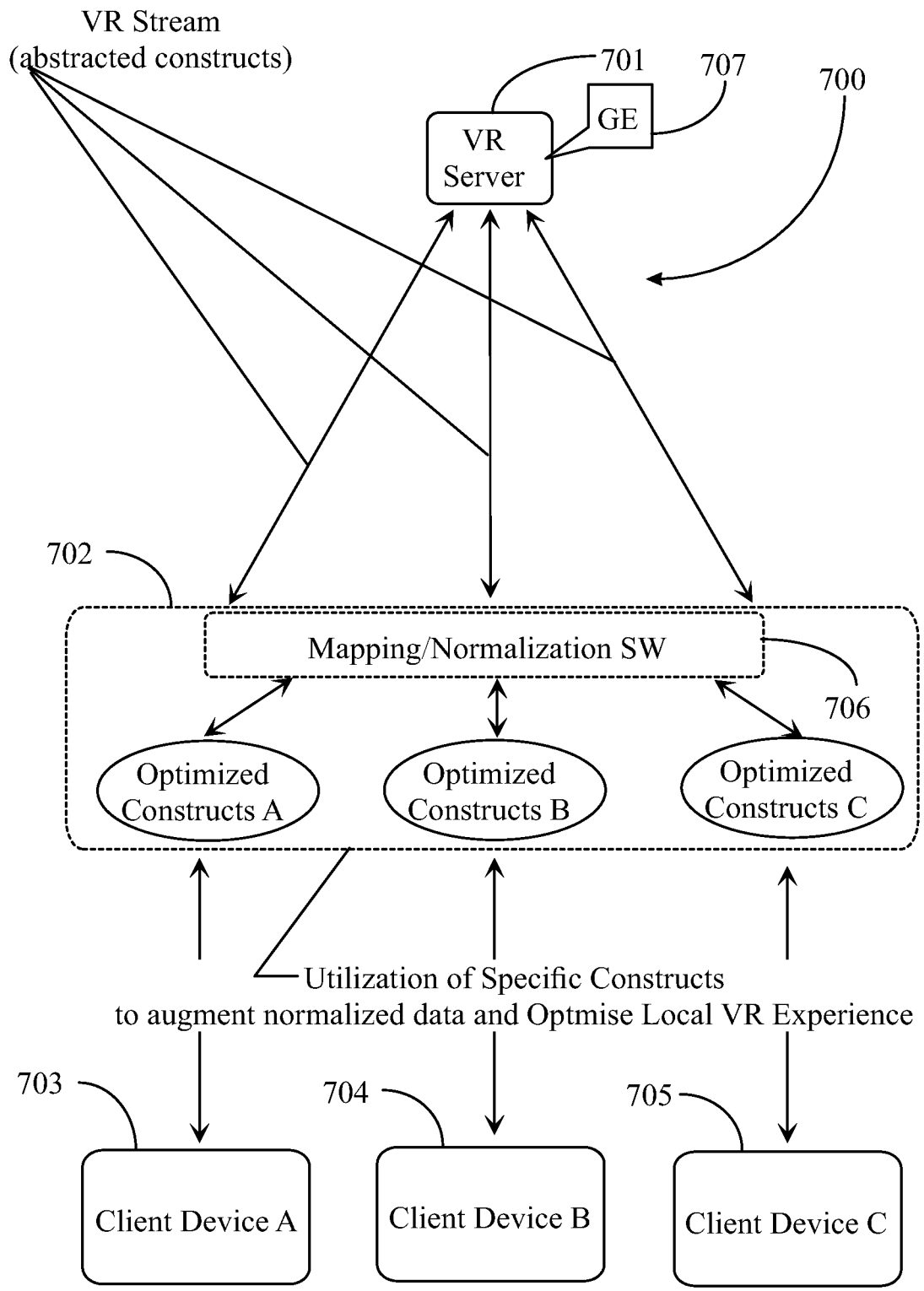
FIG. 7 is a block diagram depicting communications between a VR server and two or more disparate end devices connected to and interacting with a virtual environment, according to the embodiment of FIG. 1.

FIG. 7 is a block diagram 700 depicting communications between a VR server and two or more disparate end devices connected to and interacting with a virtual environment according to the embodiment of FIG. 1. To further illustrate an embodiment where the end devices perform construct mapping and data normalization with the aid of a proxy server, a VR server 701 is depicted running a game engine 707 serving a specific game to a client 708, a client 709, and to a client 710. Client devices 708, 709, and 710 may be widely disparate device classes as was described with reference to FIG. 1 and devices 105 through 109.

Devices 708, 709, and 710 all have sessions in progress with VR server 701 and GE 707, but through a normalization server 702, as is depicted herein by double arrows between normalization server 702 and the end devices. In this implementation, the normalization server is a proxy between the end devices and server 701 as is depicted herein by the double arrows between the normalization server 702 and VR server 701. End devices 708, 709, and 710 are assumed engaged in a VRE or 3D game play through server 702 as logically depicted herein. It may be assumed in this example that each client joined the session and has an avatar in the game or environment. From a perspective of VR server 701, all devices 708 through 710 appear as the same device class relative to the game or VRE language including instruction, feature description, and device capability to interact with such features. Therefore, all data to client devices comprises abstract constructs including instruction that is modeled after one device class or a virtual device model similar in respect to model 301 of FIG. 3.

Normalization server 702 has access to server-stored optimized constructs A on behalf of client device A (703) Likewise, server 702 has access to optimized constructs B on behalf of client device B, and to optimized constructs C on behalf of client device C. As stated further above, optimized constructs are instructions that are less abstract than co-constructs interpreted at the VR server and game engine. The term optimized refers to the fact that the construct is created in a more detailed state that addresses instruction specific to use on the instant device class and current hardware and SW platform. In the creation thereof, the optimal experience that the instant device is capable of in interaction is taken into account. Such optimized constructs may address how visual data is rendered and displayed, what interactive options for navigation the client avatar has available, whether a virtual controller is provided in case of lack of physical controller, how sensors for kinetics, movement, pressure, and the like are utilized during input, and so on.

The stream from server 701 is intercepted on behalf of each client/device by normalization server 702 running mapping/normalization SW 706 and is parsed for constructs that may map to optimized constructs stored locally at the server. In one implementation, optimized constructs and their co-constructs in the original data from the server (abstracted) may be flagged for mapping and prioritization of the optimized construct over the abstract co-construct in near real time using buffer technology to buffer the data for processing at the server.

In this implementation the client devices see the VR server and not server 702 and are transparent to the activities of server 702. For each client in session, the optimized constructs are prioritized and added to the output to each of the connected end devices. Input by the client, including interaction and selection, may be governed by the optimized constructs. However, the input is sent back from clients as raw, optimized data that may be normalized at server 702 by reversing the mapping back to the appropriate co-construct reflecting the more abstract version of the data input for VR server 701.

Normalization server 702 forwards normalized data back to server 701 for implementation on behalf of each client. In this respect, all of the devices appear the same in interaction with the server and game from the perspective of the VR server, whether a proxy adaptive server is applied or not. The primary deference in the two embodiments is that with the third-party adapter (server 702, server 113) neither VR server 701 nor an end device is burdened with the mapping process. However, in a variation where a normalization server is used, some optimized constructs may still be downloaded to end devices and utilized while other optimized constructs for the same device may be held at the server and utilized. Such consideration as to a ratio of server mapped vs end device mapped constructs may depend in part of the device and device capability.

Figure 8:
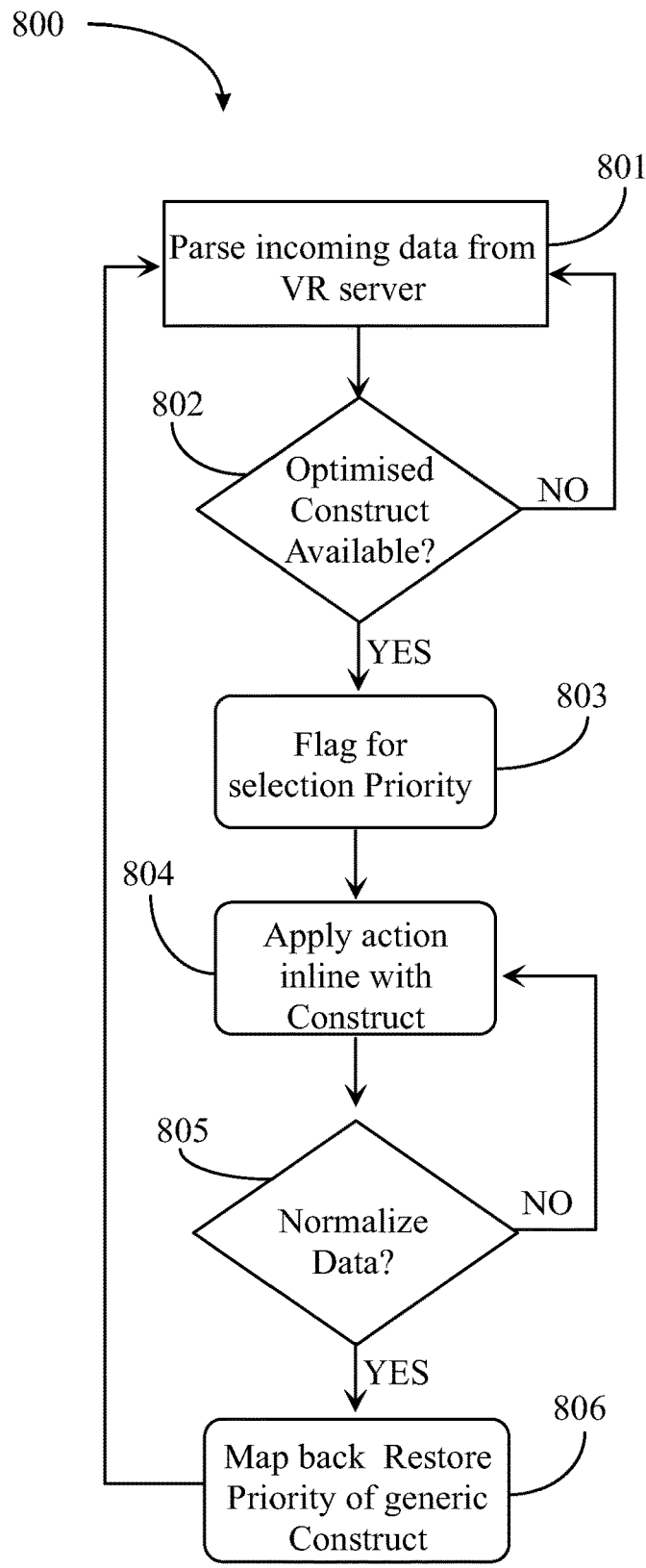
FIG. 8 is a process flow chart depicting steps for Construct marking and normalization, according to an embodiment of the present invention.

FIG. 8 is a process flow chart 800 depicting steps for construct marking and normalization according to an embodiment of the present invention. It is assumed herein that a session is established between an end device and the VR server. In one implementation, a normalization and mapping server is utilized as a proxy. The client device or proxy server if used, parses incoming data from the VR server at step 801. If a proxy server, the server has all of the end device information required to work on behalf of the client device.

The software tasked with recognizing optimized constructs specific to the client device and co-constructs received in the data stream determines at step 802 if optimized constructs are available for certain co-constructs. In one embodiment, the co-constructs are mapped to the optimized constructs previously as the optimized constructs are server stored or downloaded to the client device. In one implementation, an optimized construct may be looked up and selected that matches in performance description the co-construct in the data stream.

In one implementation, as optimized constructs are created for specific devices, they may be mapped to the more abstract or generic constructs in the game data or VRE data such that the SW may quickly reference the optimized constructs that would equate to a generic construct in the stream. It is noted herein that all of the VRE or game data need not be narrowed in terms of abstraction with an optimized construct, however there are many opportunities to create device specific constructs that optimally enhance the current device hardware and SW platform to operate according to the best possible experience, and therefore gaming or virtual world experience that might be available for the specific device class and set up.

At step 802, if it is not determined an optimized construct is available the process may resolve back to step 801 until one is found. If at step 802, one or more or a set of optimized constructs are found for augmenting (customizing) the stream data, the construct or constructs may be flagged for priority over selection and utilization of the more generic co-construct that arrived in the stream at step 803. The device may then utilize the flagged construct and instruction over the more generic one. At step 804 the prioritized constructs are utilized to perform tasks on the device relative to interacting with the game or VRE. In one aspect, the stream is altered by stripping the co-construct and selecting the optimized construct where no flag may be required.

In one aspect of the method at step 805, the determination may be made whether to normalize data created during interaction containing input by the client device. If it is determined at step 805 not to normalize data, then the process may loop back to step 804 until there is data that should be normalized going back to the VR server whether directly or through a normalization server. In one aspect if it is determined data does not need to be normalized back to the VR server, it may be because such data was not found and or the generic construct was utilized by the device where no optimized construct was required or available for that construct by design.

If at step 805 it is determined to normalize data back to the VRE/game server, then the process moves on to step 806 where the co-construct is mapped back to and restored as the used construct at the server. In one aspect, this may be as simple as removing the priority for the optimized construct relative data thus allowing the VR system to read only the generic data associated with the co-constructs. In one aspect, it may not matter if an optimized construct is sent back in data to the VR if the VR may only see the generic construct data so every device is the same and every action by the same device is viewed as the same action completed in the same way. In this way optimized performance and therefore experience may be had on the end device without loading the VR server with added work of distinguishing and accommodation the variances in supported devices.

It will be apparent to one with skill in the art that the VRE data augmentation system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A virtual reality (VR) gaming system, comprising:
a media server to generate a VR gaming environment, wherein the media server provides an interactive virtual reality environment (VRE) or three-dimensional (3D) game stream on a network, wherein the stream includes display data for displaying the 3D game or the VRE, and wherein the media server receives command data on the network for updating movement of objects, including avatars in the 3D game or the VRE;
a plurality of different makes and models of computerized appliances that each provide access to the VRE or the 3D game stream for a respective user, wherein the computerized appliances have varying processing capability in relation to at least one of:
receiving display data from the media server, and creating and sending first command data to the media server,
input capabilities; or
graphics acceleration capabilities; and
a normalization server, located intermediately on the network between the media server and the computerized appliances, to operate as a proxy that brokers communications between the media server and the computerized appliances on the network, wherein the normalization server creates and stores respective data constructs specific to the processing capability of computerized appliances in a first set of the computerized appliances, including gaming platform capabilities, 2D and 3D display capabilities for the VRE or 3D game stream, input capabilities, and graphics acceleration capabilities,
wherein the normalization server receives the first command data, for controlling game play, from the computerized appliances to the media server, amends the first command data to create second command data such that the second command data has a more abstracted data construct relative to the first command data, and sends the second command data to the media server, thereby enabling the media server to interpret all of the computerized appliances as having a common processing capability,
wherein the media server receives and processes the second command data and sends the VRE or 3D game stream, with abstracted data contained therein, to the computerized appliances via the normalization server,
wherein for the computerized appliances in the first set, the normalization server receives the VRE or 3D game stream and uses the stored respective data constructs of the computerized appliances in the first set to amend the VRE or 3D game stream such that the abstracted data contained in the VRE or 3D game stream is replaced or augmented by the normalization server to obtain a respective amended VRE or 3D game stream that is customized to respective processing capabilities of the computerized appliances in the first set, and the normalization server forwards the respective amended VRE or 3D game stream to the computerized appliances in the first set,
wherein for a first computerized appliance in the first set, the normalization server performs all of the amendment of the VRE or 3D game stream to obtain the respective amended VRE or 3D game stream that is customized to the processing capabilities of the first computerized appliance in the first set,
wherein for a second computerized appliance in the first set, the normalization server performs a portion of the amendment of the VRE or 3D game stream and the second computerized appliance performs an additional portion of the amendment of the VRE or 3D game stream, so to obtain the respective amended VRE or 3D game stream that is customized to the processing capabilities of the second computerized appliance in the first set, and
wherein for a second set of the computerized appliances, a third computerized appliance in the second set performs the amendment of the VRE or 3D game stream to obtain the respective amended VRE or 3D game stream that is customized to the processing capabilities of the third computerized appliance in the second set, without involving the normalization server for the amendment of the VRE or 3D game stream.

2. The system of claim 1, wherein the network is an Internet network.

3. The system of claim 1, wherein for the computerized appliances in the first set, the normalization server amends the VRE or 3D game stream by at least replacing display data elements in the VRE or 3D game stream received from the media server with display data elements that are optimized for each of the computerized appliances in the first set according to each of the respective data constructs, and
wherein the normalization server amends the first command data by replacing the first command data generated at each computerized appliance with the second command data prior to transmission to the media server.

4. The system of claim 1, wherein the normalization server is transparent to the media server and to the computerized appliances.

5. A method, comprising:
providing a media server configured to communicate with a plurality of computerized appliances, and a normalization server located intermediately on a network between the media server and the computerized appliances and configured to operate as a proxy that brokers communications between the media server and the computerized appliances on the network, wherein the media server, the computerized appliances, and the normalization server are coupled via the network;
creating and storing, by the normalization server, respective data constructs specific to processing capability of computerized appliances in a first set of the computerized appliances, including gaming platform capabilities, two-dimensional (2D) and three-dimensional (3D) display capabilities, input capabilities, and graphics acceleration capabilities;
receiving, via the network, at the normalization server, first command data, for controlling game play, from the computerized appliances, wherein the first command data is intended for the media server;
amending, by the normalization server, the first command data to generate second command data that has a more abstracted data construct relative to the first command data;
sending, via the network, by the normalization server, the second command data to the media server;
receiving and processing at the media server the second command data, wherein the media server recognizes the second command data as coming from remote devices having a common processing capability;
sending a virtual reality environment (VRE) or 3D game stream, with abstracted data contained therein, from the media server to each computerized appliance via the normalization server; and receiving by the normalization server, the VRE or 3D game stream from the media server;

for the computerized appliances in the first set, using, by the normalization server, the stored respective data constructs of the computerized appliances in the first set to amend the VRE or 3D game stream such that the abstracted data contained in the VRE or 3D game stream is replaced or augmented by the normalization server to obtain a respective amended VRE or 3D game stream that is customized to respective processing capabilities of each of the computerized appliances in the first set; and forwarding, by the normalization server, the respective amended VRE or 3D game stream to the computerized appliances in the first set, wherein for a first computerized appliance in the first set, the normalization server performs all of the amendment of the VRE or 3D game stream to obtain the respective amended VRE or 3D game stream that is customized to the processing capabilities of the first computerized appliance in the first set, wherein for a second computerized appliance in the first set, the normalization server performs a portion of the amendment of the VRE or 3D game stream and the second computerized appliance performs an additional portion of the amendment of the VRE or 3D game stream, so to obtain the respective amended VRE or 3D game stream that is customized to the processing capabilities of the second computerized appliance in the first set, and wherein for a second set of the computerized appliances, a third computerized appliance in the second set performs the amendment of the VRE or 3D game stream to obtain the respective amended VRE or 3D game stream that is customized to the processing capabilities of the third computerized appliance in the second set, without involving the normalization server in the amendment of the VRE or 3D game stream.

6. The method of claim 5, wherein the network is an Internet network.

7. The method of claim 5, wherein the normalization server monitors all data streams between the media server and the computerized appliances, and is configured to:

optimize display of the VRE or 3D game stream on respective screens of individual ones of the computerized appliances in the first set according to the data constructs, and amend the first command data from individual ones of the computerized appliances to create the second command data specifically required for interaction by the media server.

8. The method of claim 5, wherein the normalization server is transparent to the media server and to the computerized appliances.

9. A virtual reality (VR) gaming system, comprising:

a media server to generate a VR gaming environment, wherein the media server provides an interactive virtual reality environment (VRE) or three-dimensional (3D) game stream, wherein the stream includes display data for displaying the 3D game or the VRE, wherein the media server receives command data that pertains to movement of avatars in the 3D game or the VRE, and wherein the media server communicates with a plurality of computerized appliances that have disparate processing capabilities; and a normalization server, located intermediately on a network between the media server and the computerized appliances, to operate as a proxy that brokers communications between the media server and the computerized appliances on the network, wherein the normalization server creates and stores respective data constructs specific to the processing capability of computerized appliances in a first set of the computerized appliances, wherein the normalization server receives the first command data, for controlling game play, from the computerized appliances to the media server, amends the first command data to create second command data such that the second command data has a more abstracted data construct relative to the first command data, and sends the second command data to the media server, thereby enabling the media server to interpret all of the computerized appliances as having a common processing capability, wherein the media server receives and processes the second command data and sends the VRE or 3D game stream, with abstracted data contained therein, to the computerized appliances via the normalization server, wherein for the computerized appliances in the first set, the normalization server receives the VRE or 3D game stream and uses the stored respective data constructs of the computerized appliances in the first set to amend VRE or 3D game stream such that the abstracted data contained in the VRE or 3D game stream is replaced or augmented by the normalization server to obtain a respective amended VRE or 3D game stream that is customized to respective processing capabilities of the computerized appliances in the first set, and the normalization server forwards the respective amended VRE or 3D game stream to the computerized appliances in the first set, wherein for a first computerized appliance in the first set, the normalization server performs all of the amendment of the VRE or 3D game stream to obtain the respective amended VRE or 3D game stream that is customized to the processing capabilities of the first computerized appliance in the first set, wherein for a second computerized appliance in the first set, the normalization server performs a portion of the amendment of the VRE or 3D game stream and the second computerized appliance performs an additional portion of the amendment of the VRE or 3D game stream, so to obtain the respective amended VRE or 3D game stream that is customized to the processing capabilities of the second computerized appliance in the first set, and wherein for a second set of the computerized appliances, a third computerized appliance in the second set performs the amendment of the VRE or 3D game stream to obtain the respective amended VRE or 3D game stream that is customized to the processing capabilities of the third computerized appliance in the second set, without involving the normalization server for the amendment of the VRE or 3D game stream.

10. The system of claim 9, wherein the normalization server is transparent to the media server and to the computerized appliances.

* * * * *